April 12, 1966 W. R. SMITH-VANIZ 3,246,265

STRIPLINE VARIABLE CAPACITANCE DIODE PHASE SHIFTER

Filed Feb. 11, 1963 2 Sheets-Sheet 1

INVENTOR
WILLIAM REID SMITH-VANIZ

BY Blair & Buckles
ATTORNEYS

STRIPLINE VARIABLE CAPACITANCE DIODE PHASE SHIFTER

Filed Feb. 11, 1963 2 Sheets-Sheet 2

INVENTOR
WILLIAM REID SMITH-VANIZ
BY
Blair & Buckles
ATTORNEYS 3,246,265

STRIPLINE VARIABLE CAPACITANCE DIODE PHASE SHIFTER

William Reid Smith-Vaniz, Darien, Conn., assignor to Trak Microwave Corporation, Tampa, Fla.

Filed Feb. 11, 1963, Ser. No. 257,392
7 Claims. (Cl. 333—31)

This invention relates to a radio frequency phase shifter and to a frequency modulator incorporating the phase shifter. More specifically, the invention provides a phase shifter in which a variable reactance element varies the phase constant of a transmission line in response to a control signal. The phase shift imparted to a radio frequently voltage in the phase shifter is thus efficiently controlled by the amplitude of the control signal.

The phase constant of a transmission line specifies the phase change of the line's voltage in a unit length of the line. The phase constant thus represents the rate at which the voltage's phase angle changes.

The phase constant together with another factor, termed an attenuation constant, summarize the line's transmission characteristic, or propagation constant, according to the equation $$\text{Propagation constant} = \alpha + j\beta \quad (1)$$

where $\alpha$ is the attenuation constant, a measure of the rate at which the voltage decreases along the transmission line, and $\beta$ is the phase constant.

In a conventional transmission line, the resistive losses are small and the propagation constant can be defined as $$\text{Propagation constant} = \sqrt{LC} \quad (2)$$

and $$\beta = \omega\sqrt{LC} \quad (3)$$

where

L is the transmission line inductance per unit length,

C is the transmission line capacitance per unit length, and $\omega$ is the angular frequency, in radians per second, of the transmission line voltage.

As expressed in Equation 3, the transmission line phase constant $\beta$ varies according to the square root of the transmission line capacitance C. The phase shifter of the present invention utilizes this relationship in providing a transmission line shunted by one or more circuit elements whose capacitance can be changed by an external control signal.

The phase shifter is preferably constructed with a strip transmission line configuration and can vary the phase of a high frequency signal at a rapid rate, including radio frequency rates. This enables the phase shifter to be advantageously used in modern communication systems.

In the frequency modulator of the invention, the present phase shifter is connected with an amplifier to feed a portion of the amplifier output voltage to the amplifier input circuit to cause the amplifier to oscillate. The frequency of oscillation varies according to the phase shifter control signal.

One application of the frequency modulator is in transmitters for television relay stations; utilized to convey television signals without wires, as from a studio to a distant "viewing" area. In such a frequency modulator, the frequency of oscillation is varied, or modulated, about a center carrier frequency by controlling the variable reactance elements of the phase shifter with the video signal representing the picture being relayed.

In the prior art, frequency modulation of a microwave voltage, as the television relay carrier voltage, required a costly klystron tube operating in a complex reflex-klystron oscillator circuit.

An object of the present invention is to provide an improved phase shifter in which the phase shift is electronically controllable.

Another object of the invention is to provide an electronically controllable phase shifter in which the phase shift can be varied at a rapid rate. It is also an object that the phase shift be variable over a wide range.

A further object of the invention is to provide an improved phase shifter for modulating the phase of radio frequency signals.

Another object of the invention is to provide a phase shifter of the above character operable with a small control signal.

Yet another object of the invention is to provide a phase shifter of the above character that is compact and rugged, and that can be manufactured at a low cost.

A further object of the invention is to provide an improved frequency modulator for operation at radio frequencies.

Another object of the invention is to provide a frequency modulator for modulating a communication carrier voltage with a video signal.

It is also an object to provide a modulator of the above character that is characterized by low cost and efficient operation.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

In the illustrated phase shifter, constructed to vary the phase of a high radio frequency or microwave frequency voltage, a varactor diode is connected between the inner and outer conductors of a strip transmission line. The varactor is biased by an external control signal to be non-conducting and thereby present a capacitive reactance shunting the transmission line. Varying the amplitude of the control signal varies this capacitive reactance to change the phase constant of the transmission line.

The control signal is applied to the varactor by a filter, commonly referred to as a choke, that presents negligible impedance to the control signal but a high impedance to the higher frequency voltage on the transmission line. As a result, the transmission line voltage is substantially unaffected by the connection between the transmission line and the source of the control signal.

The phase shifter has a phase shift section coupled between two ports by coupling sections that isolate the ports from the control signal, while coupling the radio frequency voltage applied to one port through the phase shift section and to the other port. The phase shift section is preferably constructed as detailed hereinafter to achieve a large controllable change in the section's phase constant.

The invention also provides an improved frequency modulator in which the phase shifter is connected in a feedback amplifier to control the phase of its feedback voltage to cause the amplifier to oscillate. Changing the control signal applied to the phase shifter modulates the frequency of oscillation. Such a modulator is advantageously used to modulate a television carrier voltage with the video signal that represents the "picture."

Figure 1:
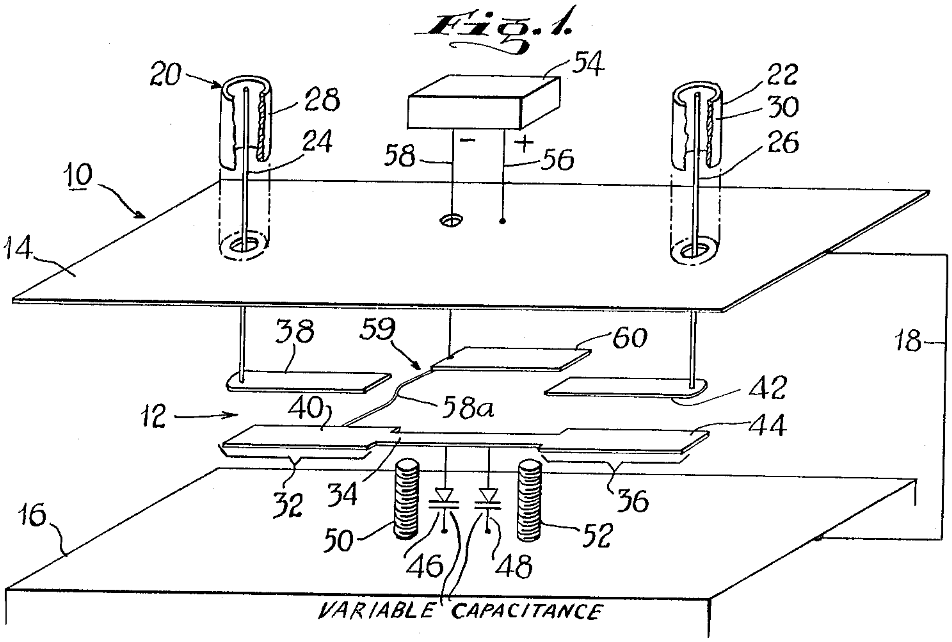
FIGURE 1 is a schematic representation of a phase shifter embodying the invention.

Turning now to FIGURE 1, the illustrated strip transmission line phase shifter indicated generally at 10 has a composite inner conductor indicated generally at 12 situated between and parallel to a pair of outer or ground plane conductors 14 and 16. The conductors composing the inner conductor 12 and the ground plane conductors 14 and 16 are preferably flat and may suitably be thin foil. The ground plane conductors 14 and 16, laterally extending beyond the inner conductor 12 to minimize fringe fields, are suitably connected together with conductor means indicated schematically at 18 to maintain them at the same potential.

The phase shifter 10 is provided with ports 20 and 22 for connecting it to other equipment. The ports 20 and 22 are suitably constructed with coaxial transmission line having inner conductors 24 and 26 concentrically disposed within outer conductors 28 and 30 respectively. The outer conductors 28 and 30 are connected to the ground plane conductor 14 and the inner conductors 24 and 26 pass through the ground plane conductor 14 to connect with the inner conductor 12.

The inner conductor 12 may be considered as having three successive sections, a coupling section 32, a phasing section 34, and a coupling section 36. As seen in FIGURE 1, the coupling section 32 has a strip conductor 38 disposed in register with and closely spaced above a strip conductor 40. The inner conductor 24 of port 20 is connected to one end of the coupling section 32 at the strip conductor 38 and the other end of the section's strip conductor 40 is connected to the phasing section 34.

The length of each strip conductor 38 and 40 is substantially a quarter-wavelength at the frequency $f1$ of the phase shifter voltage. With this construction, the strip conductors 38 and 40 form a series resonant circuit at the frequency $f1$ to couple the phase shifter voltage through the coupling section 32 with no appreciable loss.

The coupling section 36 is similarly constructed with non-contacting, quarter-wavelength strip conductors 42 and 44 to provide, at the frequency $f1$, a substantially continuous path through the inner conductor 12 between the ports 20 and 22.

The phasing section 34 of the inner conductor 12 is a strip conductor integrally disposed between the strip conductors 40 and 44. Varactor diodes 46 and 48, hereafter referred to as varactors, are connected between the inner conductor phasing section 34 and the ground plane conductor 16 to present shunt capacitances between the inner conductor and the ground plane conductor. The value of the varactor capacitances are changed with a control signal as described below to change these shunt capacitances and thereby alter the phase shift imparted to the voltage propagated by the phase shifter 10 between its ports 20 and 22.

Additional shunt capacitance between the inner conductor phasing section 34 and the ground plane conductors can be provided with threaded metal posts 50 and 52 extending from the ground plane conductor 16.

The control signal, developed in a source 54, is applied across the varactors 46 and 48 by a conductor 56 connected directly to the ground plane conductor 14 and a conductor 58 connected from the source 54 to the strip conductor 40.

The spaced apart strip conductors of each coupling section 32 and 36, presenting negligible impedance at the frequency $f1$ of the voltage whose phase is being varied, present a high impedance at the lower frequency $f2$ of the control signal. These relatively high impedance efficiently isolate the control signal from the ports 20 and 22.

The voltage on the inner conductor 12 is effectively precluded from "leaking off" on the conductor 58 by a filter, or choke circuit, indicated at 59. As seen in FIGURE 1, the filter 59 comprises a strip conductor 60 connected at one end to the conductor 58 and the conductor portion 58*a* connected between the strip conductor 40 and the strip conductor 60. The strip conductor 60 is a quarter-wavelength long at the frequency $f1$ and is closely spaced from the ground plane conductor 14. With this construction, the strip conductor 60 and the ground plane conductor 14 have low impedance between them at the frequency $f1$, operating as a series resonant circuit. The conductor position 58*a*, substantially a quarter-wavelength long at the frequency $f1$, transforms the low impedance to a high impedance at the junction between the strip conductor 40 and the conductor portion 58*a*. This large impedance impedes the phase shifter voltage from travelling on the conductor 58.

At the lower frequency $f2$ of the control signal, the impedance between the strip conductor 60 and the ground plane conductor 14 is relatively large so that substantially no control signal is shunted to the ground plane conductor 14. Further the conductor portion 58*a* presents a relatively small series impedance at the frequency $f2$. The conductor 58 thus applies the control signal, via conductor portion 58*a*, to the strip conductor 40, and hence across the varactors, substantially undiminished.

During operation of the phase shifter 10, a microwave voltage at the frequency $f1$ is applied at one of the ports 20 and 22 and removed at the other port. The control signal from source 54 maintains the conductor 58 negative with respect to the conductor 56 to bias the varactors, having their cathodes connected to the ground plane conductor 16, to be non-conducting and to operate as variable capacitors. With a forward bias, on the other hand, the varactors would conduct a conventional diodes and short-circuit the inner conductor phasing section 34 to the ground plane conductor 16.

As the control signal increases, the varactors' capacitances decrease and, as indicated by Equation 3, the phase shift along the inner conductor section 34 decreases. Conversely, a smaller control signal results in a large phase shift.

In general, the phasing section 34 is constructed to provide the maximum controllable delay per varactor that is consistent with the required transmission through the phase shifter. It has been found that this operation is obtained when the characteristic impedance of the "unloaded" phase shift section, with the varactors 46 and 48 and posts 50 and 52 being omitted, is greater than the characteristic impedance of the section when loaded with the varactors and, optionally, with the posts. A 2:1 ratio of unloaded to loaded impedances is sufficient to provide a relatively large change in transmission line capacitance, and hence in the phase shift, in response to a change in the control signal amplitude.

In the construction detailed below, the phase shift section has an unloaded characteristic impedance of 100 to 200 ohms and a loaded impedance of 50 ohms. This loaded impedance is conveniently matched to the suitable 50 ohm characteristic impedance in the ports 20 and 22. However, when desired, the quarter-wavelength coupling sections 32 and 36 can advantageously be constructed to have a characteristic impedance that enhances the impedance match between the ports and the phasing section.

The varactors 46 and 48, and the posts 50 and 52 when used, are spaced apart by less than a quarter-wavelength at the frequency $f1$; the spacing preferably is $1/12$ to $1/8$ of a wavelength. A shorter spacing tends to decrease the effect of each varactor.

It should be noted that although the inner conductors 24 and 26 are shown in FIGURE 1 extending below the ground plane conductor 14 for a substantial distance, in the illustrated construction of FIGURES 3, 4 and 5, the extension is very short to have negligible effect on the voltage in the phase shifter.

Figure 2:
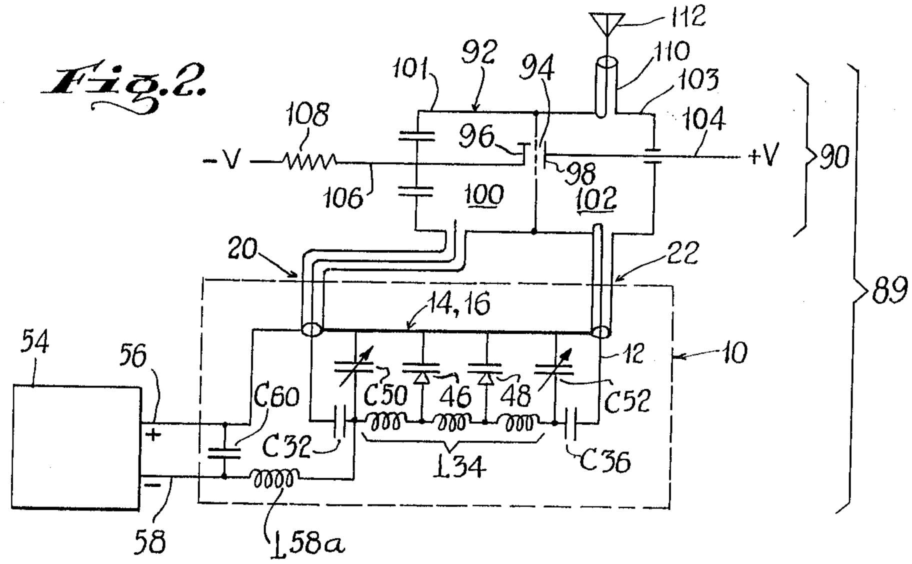
FIGURE 2 is a schematic representation of a frequency modulator embodying the invention.

FIGURE 2, discussed in full hereinafter, shows a schematic representation of the above described phase shifter 10. The ground plane conductors 14 and 16, maintained at the same potential by the conductor means 18, interconnect the outer conductors of the coaxial transmission line ports 20 and 22.

Capacitors C32 and C36, in series with the inner conductor 12, represent the coupling sections 32 and 36 respectively of FIGURE 1. The net effect of the strip conductor of the phasing section 34 is that of an inductor L34 shunted by the varactors 46 and 48 and the capacitors C50 and C52 presented respectively by the posts 50 and 52 of FIGURE 1.

The choke circuit coupling the control signal source 54 with the inner conductor 12 is represented in FIGURE 2 with a capacitor C60 shunted between the conductor 58 and the ground plane conductors 14 and 16 and with a series inductance L58*a*, equivalent to the conductor portion 58*a* of FIGURE 1.

Although the phase shifter 10 has been described as operating at a single frequency $f1$, the present construction achieves the same operation over a range of frequencies centered at $f1$.

Figures 3, 4, 5:
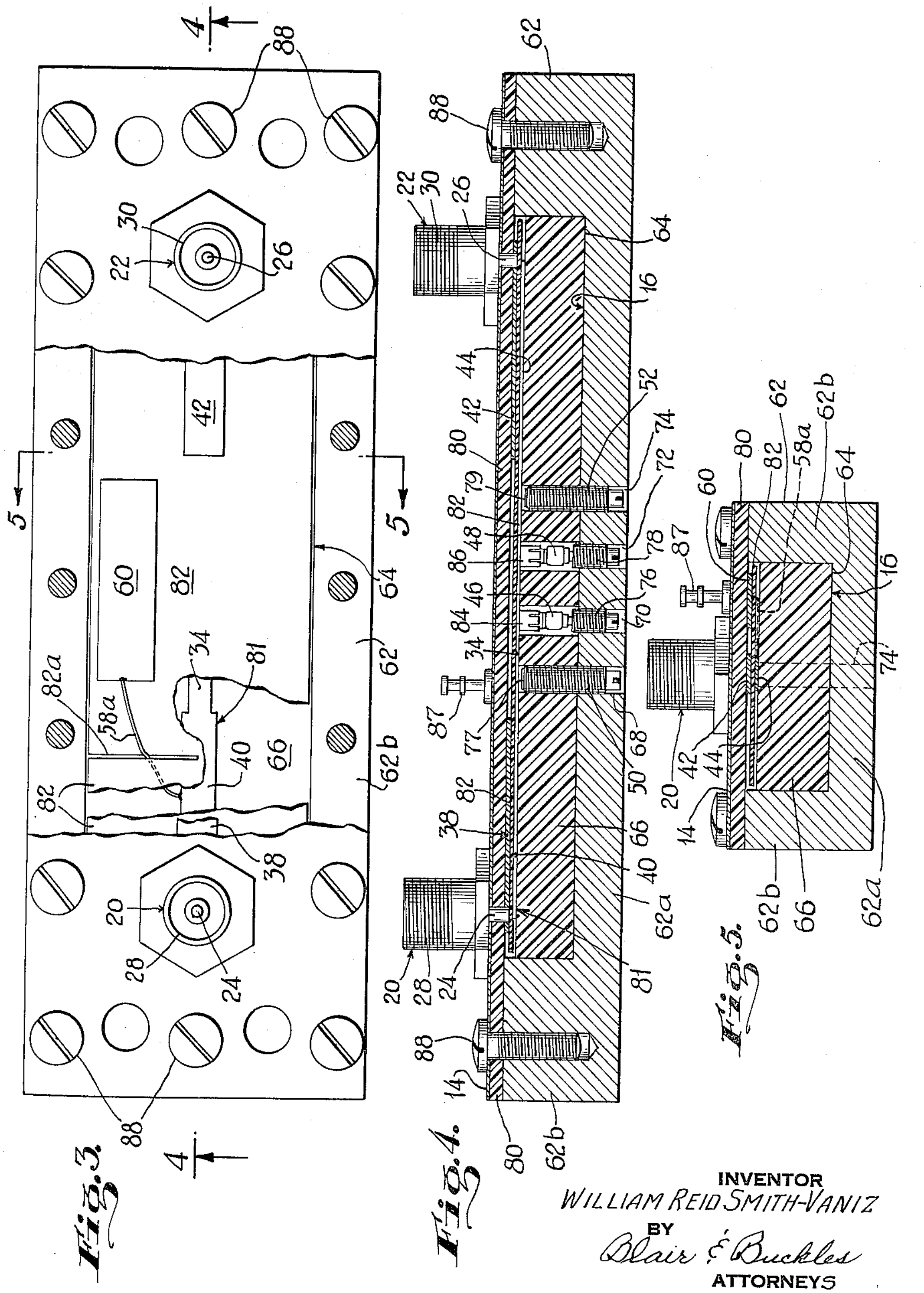
FIGURE 3 is a top plan view, partly broken away, of the phase shifter represented in FIGURE 1.
FIGURE 4 is a side elevation section view of the phase shifter of FIGURE 3, taken along line 4—4 of FIGURE 3.
FIGURE 5 is a sectional view taken along line 5—5 of FIGURE 3.

FIGURES 3, 4, and 5 show the construction of the FIGURE 1 phase shifter 10 for varying the phase of a microwave voltage, having a center frequency of 2,065 megacycles in the illustrated embodiment, at rates up to 7 megacycles per second. A housing 62, suitably made of aluminum, forms a conductive enclosure for a recess 64 of generally rectangular cross-section. The bottom of the recess 64 forms the phase shifter's ground plane conductor 16. A dielectric block 66, suitably made of polychlorotrifluoroethylene, commercially available as Kel-F, substantially fills the housing recess 64.

The housing bottom wall 62*a* and the block 66 are formed with holes 68, 70, 72 and 74, threaded where they pass through the housing wall 62*a*, preferably arranged equally spaced in a straight line through the center of the recess 64 as seen in FIGURES 4 and 5. The threaded posts 50 and 52 are retained in the holes 68 and 74, respectively, and varactor sockets 76 and 78 are threadedly retained in the holes 70 and 72, as seen in FIGURE 4. The posts 50 and 52, of conductive material, are each capped with a dielectric film 77 and 79 to prevent the posts from short circuiting against the inner conductor section 34. The capping films are suitably thin tape of terephthalate polyester, commercially available as Mylar.

The ground plane conductor 14 and the strip conductors 38, 60 and 42 are preferably fabricated from a dielectric sheet 80 clad with a conductor, such as copper, on both sides. The conductive cladding is etched away to form the desired strip conductor configuration shown in FIGURE 1. This construction, well known to those skilled in the art, provides secure support for the conductors with a fixed uniform vertical spacing between the ground plane conductor 14 and the strip conductors 38, 60 and 42.

The strip conductor indicated generally at 81 comprising the conductors 40, 34, and 44 is preferably a thin conductive ribbon, suitably .002 inch thick brass shim, sandwiched between the dielectric block 66 and a thin dielectric strip 82 disposed below the strip conductors clad to the dielectric sheet 80.

This construction is seen in FIGURE 3, where the ground plane conductor 14 and dielectric sheet 80 are cut away to reveal the strip conductor 60, a fragment of the strip conductors 38 and 42, and a fragment of the dielectric film 82. The dielectric strip 82 is also cut away to reveal fragments of the strip conductors 40 and 34 that lie beneath the strip 82 and above the block 66. The strip 82 is suitably thin terephthalate polyester, commercially known as Mylar, with a thickness of 0.001 inch.

Before assembling the strip conductor 81 on the block 66, varactor sockets 84 and 86, seen in FIGURE 4, are secured, as by soldering, to the phasing setcion 34 of the strip conductor 81 and the wire 58*a* is secured to the coupling section strip conductor 40, as seen in FIGURE 3. A slit 82*a* (FIGURE 3) is cut in the dielectric strip 82 to allow the conductor 58*a* to pass from the strip conductor 40 to contact the strip conductor 60.

A terminal 87, mounted on the dielectric sheet 80 prior to assembling the sheet on the housing 62, allows the source 54, FIGURE 1, to be connected with the strip conductor 60. The terminal 87 is isolated from the ground plane conductor 14 and contacts the strip conductor 60, as shown schematically in FIGURE 1 by the conductor 58.

The connectors that form the ports 20 and 22 are similarly preassembled on the conductor-clad dielectric sheet 80 according to conventional techniques. The sheet 80 is secured on the housing 62 with a plurality of screws 88 contacting the ground plane conductor 14 and the peripheral wall 62*b* of the housing to maintain the ground plane conductors 14 and 16 at the same potential. The screws 88 are closely spaced around the periphery of the recess 64 to prevent unwanted transmission modes and resonances from developing in the phase shifter.

In the illustrated phase shifter, designed to vary the relative phase of a 2,065 megacycle voltage at up to 8 megacycles, the depth of the recess 64 in the housing 62 is 0.270 inch and the dielectric block 66 is 0.260 inch thick. The dielectric sheet 80 and the thin copper cladding on both sides have a total thickness of 0.062 inch.

The strip conductors 38, 40, 42 and 44 are 0.150 inch wide while the width of the conductor of the phasing section 34 is 0.100 inch. The strip conductor 60 has a width of 0.265 inch.

A suitable varactor is manufactured by the Sylvania Electric Products, Inc., designated as No. D4343.

This construction achieves a controllable phase change as high as 15° to 20° for each varactor when the control signal is varied between one-quarter and three-quarters of the varactor break-down voltage. The loss through the phase shifter is only 1 or 2 decibels.

Turning now to FIGURE 2, the frequency modulator indicated generally at 89 illustrating further features of the present invention is schematically represented as comprising a microwave amplifier indicated generally at 90 and the phase shifter 10, together with the control signal source 54. The amplifier 90 utilizes a high frequency triode 92, suitably incorporating planar construction, having a grid 94, a cathode 96, and an anode or plate 98.

The amplifier develops its input voltage between the triode's grid 94 and cathode 96 with a tuned input circuit 100 shown as a cavity formed by a conductive shell 101. The output voltage appears between the grid 94 and anode 98 in a similar tuned distributed parameter output circuit 102, shown formed by a shell 103. The tuning of the input and output circuits is sufficiently broad to enable the amplifier 90 to operate throughout the range of frequencies over which its central frequency is modulated as described below.

A conductor 104 applies a positive D.C. voltage to the anode 98 of the triode 92 and a negative D.C. voltage is applied by a conductor 106 and a series resistor 108 to the cathode 96 to provide operating power for the amplifier. The conductors 104 and 106 are isolated from the cavity shells 101 and 103 to prevent the microwave voltages in the amplifier 90 from leaking onto the conductors.

This construction for microwave circuits is well known to those skilled in the art, and is discussed in chapters 5 and 6 of Department of the Army Technical Manual TM 11–673 and in chapters X and XII of "Principles of Radar" published by the McGraw-Hill Book Co., Inc., 1952.

A probe 110, shown constructed as a coaxial current probe, couples the modulator 89 output voltage from the amplifier output circuit 102. The probe is connected to deliver the output voltage to a load device 112. When the modulator is used in a transmitter, the load device is an antenna that radiates the frequency modulated voltage. Such a transmitter may have amplifiers, not shown, connected between the modulator 90 and the antenna 112.

The port 22 of the phase shifter 10 is connected with the amplifier output circuit 102 to apply a portion of the output voltage to the phase shifter. The phase shifter then delivers a selectively phased feedback voltage to the amplifier input circuit 100 via the phase shifter port 20. When the phase delay through the phase shifter is an integral number of wavelengths at a frequency within the amplifier's range of operating frequencies, the feedback voltage causes the amplifier to oscillate at that frequency.

Another characteristic of the amplifier 90 is that it provides sufficient gain for sustained oscillation when thus connected with the phase shifter 10. Further, the phase-frequency characteristic of the oscillating amplifier should conform to the phase-voltage characteristic of the phase shifter. That is, the change in frequency of oscillation due to a change of the phase shifter, imparted by the phase shifter between the amplifier output circuit 102 and its input circuit 100, should conform to the change in phase shifter delay that results from a change in the control voltage.

As stated above, the phase shifter varactors 46 and 48 are biased by the source 54 to be non-conducting. Accordingly, the signal from the source 54 may be considered as comprising a modulating signal superimposed on a constant voltage component that equals or exceeds the average value of the modulating signal. Thus, the combined control signal does not change polarity and has a maximum variation from zero volts to twice the constant voltage component. It has been found that a control signal variation from one-quarter to three-quarters of the varactor breakdown voltage is preferred.

In the frequency modulator illustrated in FIGURE 2, the constant voltage component of the source 54 control signal biases the varactors 46 and 48 to provide a phase delay equal to an integral number of wavelengths at a desired carrier frequency *fc*. This causes the amplifier 90 to oscillate at the carrier frequency. The modulating signal component of the control signal then varies the varactors' capacitances, varying the phase delay provided by the phase shifter 10 between the amplifier circuits 102 and 100, to vary the frequency of oscillation about the carrier frequency *fc*. In this manner, the amplifier 90 develops in its output circuit 102 a frequency modulated voltage having a central frequency of *fc*.

A frequency modulator constructed as described above develops a modulated voltage having a center frequency of 2,065 megacycles with a frequency deviation of plus or minus 4 megacycles. An output power of 3 to 4 watts is delivered to the antenna or other load 112 of FIGURE 2.

The principles of the phase shifter and frequency modulator described above are also applicable to wave guides and to other transmission line configurations than strip transmission line.

In summary, described above is a two port device for imparting a variable phase shift to a radio frequency voltage travelling between the ports. The phase shift is controlled by an external signal applied to variable reactance elements that are coupled in the phase shifter to vary the phase constant of the radio frequency path between its ports. The phase shifter construction provides a rugged, compact, low cost device that imparts a controllable phase shift to a microwave voltage. The phase shift can be varied at similarly high frequencies.

The phase shifter can be constructed with a plurality of variable reactance elements to provide the desired range of controllable phase shift, and can handle substantial amounts of power.

Also described is a frequency modulator utilizing the phase shifter of the present invention connected in the feedback path of a radio frequency amplifier to cause the amplifier to oscillate. The frequency of oscillation is efficiently modulated by the control signal applied to the phase shifter. The modulator does not require costly components, is reliable, and is constructed to have a small space requirement.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described the invention, what is claimed as new and secured by Letters Patent is:

1. A transmission line phase shifter for adjusting the phase of a high frequency voltage with a control signal having a frequency lower than a first frequency of said voltage, said phase shifter comprising, in combinations:
- (A) first and second high frequency ports;
- (B) a high frequency transmission line connected between said ports and having
  - (1) an inner conductor and an outer conductor successively constituting a coupling section, a phasing section, and a coupling section,
    - (a) said inner conductor in each coupling section being constructed with two conducting members closely spaced from each other,
      - (i) said conducting members being substantially a quarter wave length long at said first frequency,
      - (ii) one conducting member being coupled to one of said ports and the other conducting member being coupled with said phasing section so as to couple said voltage, with no appreciable loss, between said ports and said phasing section while isolating said ports from said phasing section at said control signal frequency,
      - (iii) said conducting members in each coupling section operating at said first frequency of said voltage as a series resonant circuit to present a relatively matched impedance between one of said ports and said phasing section;
- (C) a variable capacitance element coupled in said transmission line phasing section to vary the phase constant of said transmission line in response to changes in the control siginal amplitude;
- (D) a filter circuit connected between said transmission line and the conductors to which the control signal is applied,
  - (1) said filter circuit delivering said control signal to said element to vary said element's capacitance and thereby vary the transmission line phase constant,
  - (3) said filter circuit further presenting high impedance to said voltage on said transmission line to constrain said voltage from traveling on to said filter circuit.

2. The combination defined in claim 1 in which said phasing section of said transmission line is constructed to have a characteristic impedance, when considered without said element, that is substantially greater than its characteristic impedance with said element so that a relatively large controllable phase shift is achieved by changing the amplitude of the control signal applied to said element.

3. The combination defined in claim 1 in which said element is a varactor diode biased by the control signal to be non-conducting.

4. The combination defined in claim 1 in which
(A) said element is connected between said inner and outer conductors, and
(B) said filter circuit comprises
(1) a first conductor a quarter-wavelength long at said first frequency and closely spaced from said outer conductor,
(a) said first conductor and said outer conductor being series resonant at said first frequency of said voltage to have a relatively low impedance between them,
(2) a second conductor connected between said first conductor and said transmission line inner conductor,
(a) said second conductor transforming the series resonance low impedance between said first conductor and said outer conductor to a high impedance at the junction between said inner conductor and said second conductor to constrain said voltage from travelling onto said filter circuit.

5. A transmission line phase shifter for varying the relative phase of a microwave voltage with a lower frequency control signal, said phase shifter comprising in combination
(A) first and second microwave ports,
(B) a transmission line connected with said ports to propagate said microwave voltage between them,
(1) said transmission line comprising a first conductor and a composite second conductor spaced above said first conductor,
(2) said composite second conductor comprising a first conductive member and second and third conductive members spaced between said first conductive member and said first conductor,
(3) said first conductive member successively comprising a first coupling portion, a phasing section and a second coupling portion,
(a) said first and second coupling portions being disposed respectively in registered alignment with said second and third conductive members,
(4) said second and third conductive members being isolated from said first conductive member at said lower frequency of said control signal,
(C) at least one variable reactance element connected between said first conductive member phasing section and said first conductor to vary the transmission line phase constant along said phasing section in response to changes in said control signal applied across said element,
(D) first and second conductor means for receiving said control signal between them,
(1) said first conductor means being connected with said first conductor, and
(E) an inner conductor choke circuit connected between said second conductor means and said first conductive member,
(1) said choke circuit presenting a relatively low impedance to said control signal between said second conductor means and said first conductive member and
(2) presenting a relatively large impedance at the junction between said choke circuit and said first conductive member to impede said voltage from leaking onto said choke circuit.

6. A strip transmission line phase shifter for varying the relative phase of a microwave voltage with a lower frequency control signal, said phase shifter comprising in combination
(A) a conductive housing having a flat surface that forms a strip transmission line ground plane conductor,
(B) a dielectric block disposed above said flat surface,
(C) a first strip conductor, constituting a strip transmission line inner conductor, disposed above said block parallel to said flat surface of said housing,
(1) said first strip conductor successively comprising a first coupling portion, a phasing section narrower than said coupling portion and a second coupling portion,
(D) a varactor diode connected through said dielectric block between said flat surface and said phasing section of said first conductor,
(E) a thin dielectric strip disposed above said first strip conductor,
(1) means forming a slot in said dielectric strip extending transverse to said first strip conductor and laterally removed therefrom,
(F) second and third strip conductors disposed above said dielectric strip parallel to said flat housing surface and respectively in register with said first and second coupling portions,
(1) said first, second and third strip conductors being constructed so that said transmission line propagates a microwave voltage between said second and third conductors by means of said first conductor,
(G) a fourth strip conductor disposed above said dielectric strip parallel to said flat housing surface and laterally spaced from said first strip conductor,
(H) a conductive strand connected between said first and fourth strip conductors
(1) said conductive strand passing through said dielectric strip at the slot therein,
(2) said fourth strip conductor and said strand delivering said control signal from said fourth conductor to said varactor,
(I) a dielectric sheet disposed above said second, third and fourth strip conductors,
(J) a conductor disposed above said dielectric sheet parallel to said flat housing surface to form a second strip transmission line ground plane conductor, and
(K) conducting means connecting said ground plane conductors together to maintain them at the same potential.

7. The phase shifter defined in claim 5 in which
(A) said first conductor is a strip transmission line ground plane conductor,
(B) said second conductor is a composite strip transmission line inner conductor, and
(C) said conductive members are strip conductors.

References Cited by the Examiner

UNITED STATES PATENTS

| | | | |
|---|---|---|---|
| 2,521,694 | 9/1950 | Crosby | 332—19 |
| 2,657,359 | 10/1953 | Crosby | 332—19 |
| 3,109,152 | 10/1963 | Dachert | 333—31 |
| 3,146,413 | 8/1964 | Butler | 333—31 |

OTHER REFERENCES

Theory of TEM Diode Switching, Garver, IRE Transactions on Microwave Theory and Techniques, May 1961, pp. 232–234.

HERMAN KARL SAALBACH, *Primary Examiner.*

ALFRED L. BRODY, *Examiner.*